(12) United States Patent
Chalmers et al.

(10) Patent No.: US 11,099,068 B2
(45) Date of Patent: *Aug. 24, 2021

(54) OPTICAL INSTRUMENTATION INCLUDING A SPATIALLY VARIABLE FILTER

(71) Applicant: FILMETRICS, INC., San Diego, CA (US)

(72) Inventors: Scott A. Chalmers, San Diego, CA (US); Randall S. Geels, San Diego, CA (US); Matthew F. Ross, San Diego, CA (US)

(73) Assignee: FILMETRICS, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,701

(22) Filed: Mar. 3, 2017

(65) Prior Publication Data

US 2017/0254641 A1 Sep. 7, 2017

Related U.S. Application Data

(63) Continuation-in-part of application No. 15/367,715, filed on Dec. 2, 2016, now Pat. No. 10,240,981.

(Continued)

(51) Int. Cl.
| | | |
|---|---|---|
| *G01J 3/10* | (2006.01) | |
| *G01N 21/45* | (2006.01) | |
| *G01J 3/26* | (2006.01) | |
| *G01N 21/25* | (2006.01) | |
| *G01B 11/06* | (2006.01) | |
| *G01N 21/84* | (2006.01) | |

(Continued)

(52) U.S. Cl.
CPC ............ *G01J 3/10* (2013.01); *G01B 11/0625* (2013.01); *G01J 3/26* (2013.01); *G01N 21/255* (2013.01); *G01N 21/45* (2013.01); *G01N 21/8422* (2013.01); *G01J 2003/123* (2013.01); *G01J 2003/1243* (2013.01); *G01J 2003/2866* (2013.01); *G01N 2021/8427* (2013.01)

(58) Field of Classification Search
CPC .. G01B 11/2441; G01B 11/06; G01B 9/02049
See application file for complete search history.

(56) References Cited

U.S. PATENT DOCUMENTS 5,282,121 A * 1/1994 Bornhorst ............. F21S 10/007
362/294
6,057,925 A * 5/2000 Anthon ..................... G01J 3/02
356/419

(Continued)

*Primary Examiner* — Hwa Andrew Lee
(74) *Attorney, Agent, or Firm* — Hodgson Russ LLP

(57) ABSTRACT

A system comprising a light source, and a retention device configured to receive and retain a sample for measurement. The system includes a detector. An optical path couples light between the light source, the sample when present, and the detector. An optical objective is configured to couple light from the light source to the sample when present, and couple reflected light to the detector. A controller is configured to automatically control focus and/or beam path of the light directed by the optical objective to the sample when present. The system includes a spatially variable filter (SVF) positioned in the optical path. The SVF is configured to have spectral properties that vary as a function of illuminated position on the SVF.

45 Claims, 8 Drawing Sheets

Related U.S. Application Data

(60) Provisional application No. 62/303,701, filed on Mar. 4, 2016.

(51) Int. Cl.
    *G01J 3/12*     (2006.01)
    *G01J 3/28*     (2006.01)

(56) References Cited

U.S. PATENT DOCUMENTS

| | | | |
|---|---|---|---|
| 7,286,242 B2 * | 10/2007 | Kim | G01B 11/0625 356/504 |
| 2004/0246493 A1 * | 12/2004 | Kim | G01B 11/0625 356/504 |
| 2004/0246612 A1 * | 12/2004 | Niwa | G02B 26/008 359/892 |
| 2006/0158657 A1 * | 7/2006 | De Lega | G01B 9/023 356/497 |
| 2012/0038928 A1 * | 2/2012 | Saari | G01J 3/02 356/454 |
| 2012/0218560 A1 | 8/2012 | Joo | |
| 2013/0298294 A1 | 11/2013 | Kim | |

\* cited by examiner

OPTICAL INSTRUMENTATION INCLUDING A SPATIALLY VARIABLE FILTER

RELATED APPLICATIONS

This application claims the benefit of U.S. Patent Application No. 62/303,701, filed Mar. 4, 2016.

This application is a continuation in part of U.S. patent application Ser. No. 15/367,715, filed Dec. 2, 2016.

This application is related to U.S. patent application Ser. Nos. 13/742,782 and 13/743,210, both filed Jan. 16, 2013.

TECHNICAL FIELD

This invention relates generally to the field of optical instrumentation.

BACKGROUND

In the field of optical instrumentation there is a need for instrumentation to generate data representing a film thickness and a surface profile of a sample under evaluation.

INCORPORATION BY REFERENCE

Each publication, patent, and/or patent application mentioned in this specification is herein incorporated by reference in its entirety to the same extent as if each individual publication, patent and/or patent application was specifically and individually indicated to be incorporated by reference.

BRIEF DESCRIPTION OF THE DRAWINGS

The components in the figures are not necessarily to scale, emphasis instead being placed upon illustrating the principles of the embodiments. In the figures, like reference numerals designate corresponding parts throughout the different views.

DETAILED DESCRIPTION

Figure 1A:
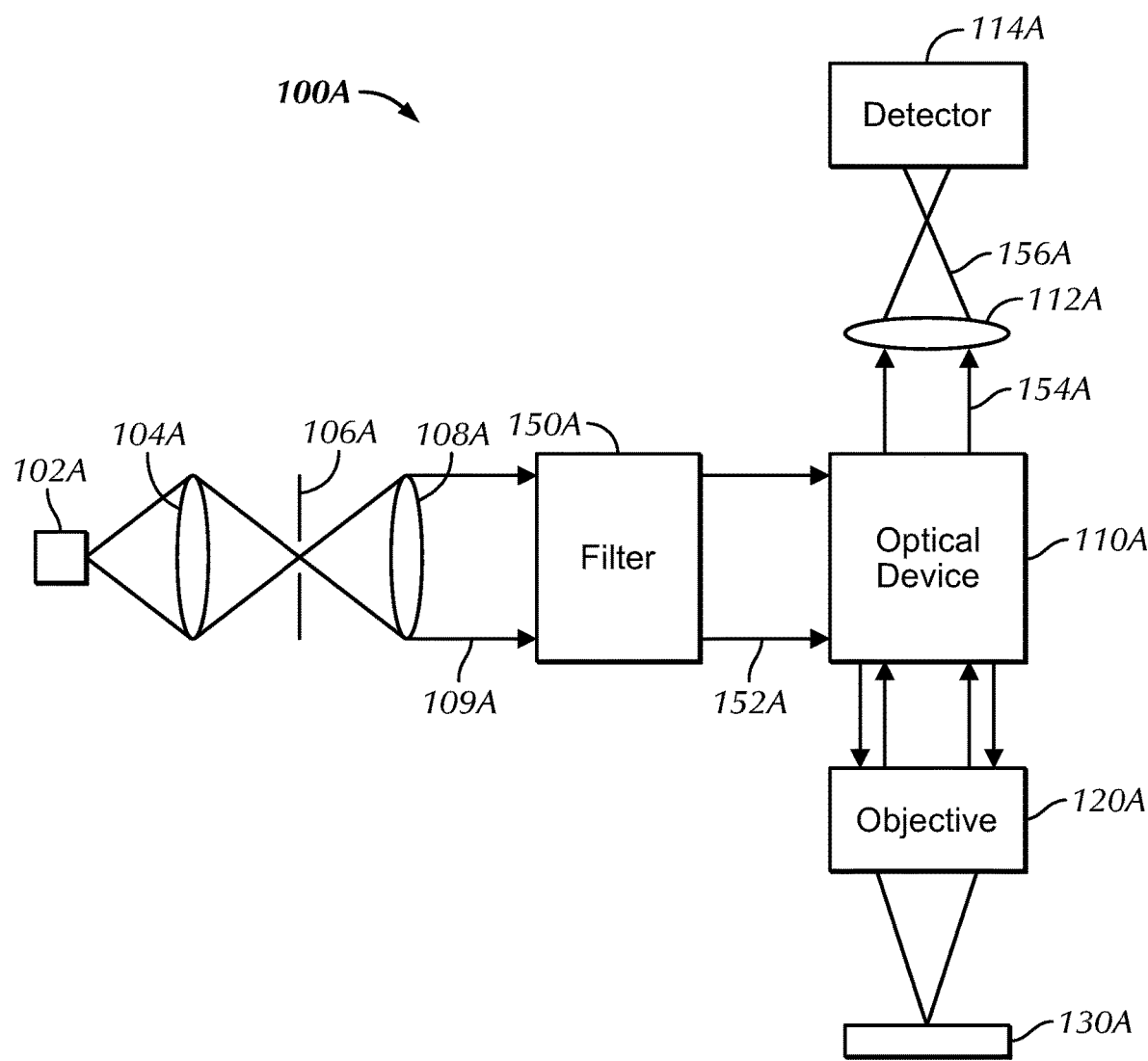
FIG. 1A is a general block diagram of an electro-optical system comprising a profilometer, or surface profiler, under an embodiment.

Electro-optical systems or instrumentation are described herein that include optical profilometers configured for thin film measurements. These optical profilometers include profilometers configured for vertical scanning interferometry (VSI), for example. The optical profilometers also comprise instrumentation configured for confocal microscopy, which measures the surface profile of a sample using differences in focus (e.g., z-motion controller) combined with the light source. More particularly, the optical profilometer in the confocal microscopy configuration comprises an intensity measuring element (e.g., measures light intensity dependent on sample surface height) along with a translation element that scans or adjusts the relative position between an objective (e.g., microscope objective) and a sample positioned on a stage in order to measure focus intensity as a function of z position. As an alternative to the z-stage translation element, an embodiment includes an optical element configured to change beam path or optical path between the objective and the sample while maintaining a fixed relationship between a position of the objective relative to the position of the sample.

The optical profilometers described herein, when including components or systems configured for vertical scanning interferometry (VSI), provide a non-contact optical method for surface height measurement on three-dimensional (3D) structures having varying surface profiles (e.g., vary between tens of nanometers and a few centimeters). Vertical scanning interferometry makes use of the wave superposition principle to combine waves in a way that will cause the result of their combination to extract information from those instantaneous wave fronts. This works because when two waves combine, the resulting pattern is determined by the phase difference between the two waves, meaning waves that are in phase undergo constructive interference while waves that are out of phase undergo destructive interference. A detector or image sensor is placed at the point where the two images are superimposed. Generally, a broadband "white light" source is used to illuminate the test and reference surfaces. A condenser lens collimates the light from the broadband light source, and an optical device (e.g., beam splitter) separates the light into reference and measurement beams. The reference beam is reflected by a reference component (e.g., mirror, reflector, etc.), while the measurement beam is reflected or scattered from the sample surface. The two reflected beams are relayed by the optical device to the detector, and form an interference pattern of the test surface topography that is spatially sampled by the detector (e.g., individual CCD pixels).

The interference occurs when the path lengths of the measurement beam and the reference beam are nearly matched. By scanning or changing (e.g., vertically, etc.) the measurement beam path length relative to the reference beam, a correlogram is generated at each pixel. The width of the resulting correlogram is the coherence length, which depends strongly on the spectral width of the light source. Interference occurs at the detector (e.g., pixel) if the optical path lengths of the measurement and reference beams differ less than half the coherence length of the light source. Each pixel of the detector samples a different spatial position within the image of the sample surface.

A white light correlogram (interference signal) is produced when the length of the reference or measurement beam arm is scanned by a positioning stage through a path length match. The interference signal of a pixel has maximum modulation when the optical path length of light impinging on the pixel is exactly the same for the reference and the measurement beams. Therefore, the z-value for the point on the surface imaged by this pixel corresponds to the z-value of the positioning stage when the modulation of the correlogram is greatest. The height values of the object surface are found by determining the z-values of the positioning stage where the modulation is greatest for every pixel. The vertical uncertainty depends primarily on the roughness of the measured surface. The lateral positions of the height values depend on the corresponding object point that is imaged by the pixel matrix. These lateral coordinates, together with the corresponding vertical coordinates, describe the surface topography of the sample under VSI.

The optical profilometers described herein, when including components or systems configured for confocal microscopy, provide optical imaging for increasing optical resolution and contrast of a micrograph through use or inclusion of a spatial aperture or field stop placed at the confocal plane of the lens to eliminate out-of-focus light. Elimination of out-of-focus light enables the reconstruction of 3D structures from the obtained images. The principle of confocal imaging overcomes limitations of conventional wide-field microscopes in which the entire specimen is evenly flooded in light from the light source. Consequently, all portions of the specimen in the optical path are simultaneously excited and the resulting reflectance is measured at a detector coupled to the microscope.

In contrast, a confocal microscope configuration uses point illumination and an aperture in an optically conjugate plane in front of the detector to eliminate out-of-focus signal. As only light produced by reflectance very close to the focal plane can be detected, the optical resolution of the image, particularly in the sample depth direction, is relatively better than that obtained with wide-field microscopes. As only one point in the sample is illuminated at a time, two-dimensional (2D) or 3D imaging includes scanning over a regular raster (e.g., a rectangular pattern of parallel scanning lines) in the specimen. The achievable thickness of the focal plane is defined mostly by the wavelength of the light used divided by the numerical aperture of the objective lens, but also by the optical properties of the specimen. The thin optical sectioning possible makes these types of microscopes particularly good at 3D imaging and surface profiling of samples.

Optical profilometer configurations described herein include profilometers (e.g., VSI, confocal microscopy, etc.) configured to include one or more spatially variable filters (SVFs). A spatially variable filter (SVF) is an optical interference filter having spectral properties that vary as a function of position (e.g., linear, parabolic, etc.) on the filter, compared to a conventional optical filter with spectral functionality configured to be identical at any location or point on the filter. In the following description, numerous specific details are introduced to provide a thorough understanding of, and enabling description for, embodiments herein. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

In the following description, numerous specific details are introduced to provide a thorough understanding of, and enabling description for, embodiments of the reflectance systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

A system comprising a light source, and a retention device configured to receive and retain a sample for measurement. The system includes a detector. An optical path couples light between the light source, the sample when present, and the detector. An optical objective is configured to couple light from the light source to the sample when present, and couple reflected light to the detector. A controller is configured to automatically control focus and/or beam path of the light directed by the optical objective to the sample when present. The system includes a spatially variable filter (SVF) positioned in the optical path. The SVF is configured to have spectral properties that vary as a function of illuminated position on the SVF. FIG. 1A is a block diagram of an electro-optical system 100A comprising a profilometer, or surface profiler, under an embodiment. Embodiments of the electrical-optical system described herein include measurement instruments that detect and measure the surface profile of a sample (e.g., silicon wafer, etc.). The surface profiler is a non-contact surface profiler but is not so limited. The system 100A includes a light source configured to form an aperture image. The light source (e.g., white light, light emitting diode (LED), Xenon lamp, Halogen lamp, laser, etc.) of an embodiment includes a radiation source 102A, a condensing lens 104A, an aperture 106A (e.g., circular, rectangular, etc.) or field stop, and a collimator lens 108A or relay. Light passing through aperture 106A impinges on the collimator lens 108A to form a beam 109A of collimated light. The size and configuration of the aperture 106A or field stop, which is selected as appropriate to a configuration of the system 100A, determines the field angles in the collimated light sections of the optical system and the orientation is chosen to allow an aperture image to be projected onto the sample 130A (when present). Alternatively, the radiation source 102A may be replaced by a fiber optic light guide but is not so limited.

The system 100A includes a filter 150A, which includes one or more different filter types as described in detail herein, and an objective 120A. The collimated light 109A from the collimator lens 108A is incident on the input of the filter 150A. The light output 152A from the filter 150A is incident upon an optical device 110A that is configured to divide the incident light. The optical device 110A of an embodiment includes a beam splitter 110A, but is not so limited. The light is transmitted through the optical device 110A to an objective 120A, which includes one or more different objective types as described in detail herein. For example, the objective 120A of an embodiment includes a Mirau interferometry objective 120A available from Nikon Corporation. Alternatively, the objective 120A includes a Michelson interferometry objective. The objective 120A of another alternative embodiment includes a Linnik interferometry objective. Additionally, the objective 120A is a custom objective as appropriate to a configuration of the electro-optical system.

The system 100A of various embodiments described herein comprises an objective that includes and/or is coupled or connected to a reference section or system as appropriate to a type and location of the objective and/or the reference section. Accordingly, the objective 120A is configured to focus and/or couple light to a reference component (not shown) but is not so limited. A first portion of the light focused onto the reference component from the objective 120A is reflected from the reference component and passes back through the objective 120A and returns to the optical device 110A where it forms a first aperture image. A second portion of the light focused onto the reference component passes through the reference component, which is configured to illuminate the surface of the sample 130A by focusing the second portion of the light onto the surface of the sample 130A (when present). The light emitted or reflected from the surface of the sample 130A returns through the objective 120A and forms a second aperture image on the optical device 110A.

The first and second images or beams returning from the sample and the reference mirror recombine and interfere at the optical device 110A. Light 154A from the optical device 110A is incident on a lens 112A where images are formed of the interference pattern of the reference mirror surface and the sample surface. The lens 112A redirects the aperture images 156A to a detector 114A (e.g., charge coupled device (CCD) camera, complementary metal-oxide semiconductor (CMOS) camera, photodiode, linear arrays, etc.). The detector of an embodiment includes and/or is coupled or connected to a processor configured to process the data from the detector and, optionally, format and/or display raw or processed data in various formats.

Figure 1B:
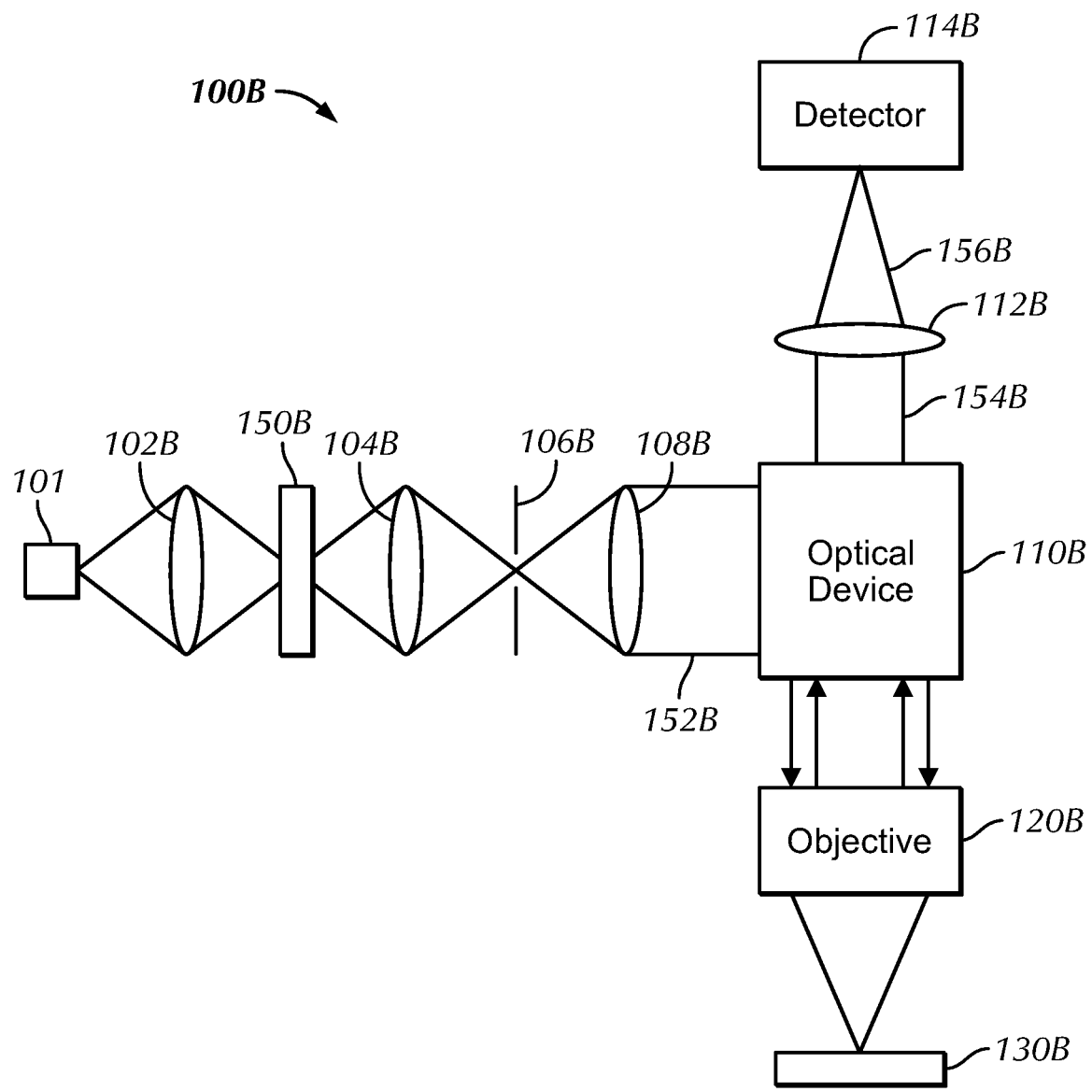
FIG. 1B is a block diagram of an electro-optical system comprising an alternative filter placement, under an alternative embodiment.

A configuration of the electro-optical system of one or more alternative embodiments includes alternative filter placements or configurations. For example, FIG. 1B is a block diagram of an electro-optical system 100B comprising an alternative filter placement, under an alternative embodiment. The system 100B includes a light source configured to form an aperture image. The light source (e.g., white light, LED, Xenon lamp, Halogen lamp, laser, etc.) of an embodiment includes a radiation source 101B and a first condensing lens 102B. The first condensing lens 102B focuses incident light from the radiation source 101B onto the input of a filter 150B. Light output from the filter 150B is directed at a second condensing lens 104B, which focuses the incident light onto an aperture 106B (e.g., circular, rectangular, etc.). Light passing through aperture 106B impinges on a collimator lens 108B, which outputs collimated light 152B. The size and configuration of the aperture 106B, which is selected as appropriate to a configuration of the system 100B, determines the field angles in the collimated light sections of the optical system and the orientation is chosen to allow an aperture image to be projected onto the sample 130B.

The system 100B includes a filter 150B, which includes one or more different filter types as described in detail herein, and an objective 120B. The light from the first condensing lens 102B is incident on the filter 150B. Light output from the filter 150B is directed at a second condensing lens 104B, which focuses the incident light onto an aperture 106B (e.g., circular, rectangular, etc.). The shape or configuration of the aperture is optimized according to the detector included in the system (e.g., optimized to aspect ratio of image sensor, etc.).

Light passing through aperture 106B impinges on a collimator lens 108B, which outputs collimated light 152B that is incident upon an optical device 110B that is configured to divide the incident light. The optical device 110B of an embodiment includes a beam splitter 110B, but is not so limited. The light is transmitted through the optical device 110B to an objective 120B, which includes one or more different objective types as described in detail herein. For example, the objective 120B of an embodiment includes a Mirau interferometry objective 120B available from Nikon Corporation. Alternatively, the objective 120B includes a Michelson interferometry objective. The objective 120B of another alternative embodiment includes a Linnik interferometry objective.

The system 100B of various embodiments comprises an objective that includes and/or is coupled or connected to a reference section or system as appropriate to a type and location of the objective and/or the reference section. Accordingly, the objective 120B is configured to focus and/or couple light to a reference component (not shown) but is not so limited. A first portion of the light focused onto the reference component from the objective 120B is reflected from the reference component and passes back through the objective 120B and returns to the optical device 110B where it forms a first aperture image. A second portion of the light focused onto the reference component passes through the reference component, which is configured to illuminate the surface of the sample 130B by focusing the second portion of the light onto the surface of the sample 130B (when present). The light emitted or reflected from the surface of the sample 130B returns through the objective 120B and forms a second aperture image on the optical device 110B.

The first and second images or beams returning from the sample and the reference component recombine and interfere at the optical device 110B. Light 154B from the optical device 110B is incident on a lens 112B where images are formed of the interference pattern of the reference component surface and the sample surface. The lens 112B redirects the aperture images 156B to a detector 114B (e.g., charge coupled device (CCD) camera, complementary metal-oxide semiconductor (CMOS) camera, photodiode, linear arrays, etc.). The detector of an embodiment includes and/or is coupled or connected to a processor configured to process the data from the detector and, optionally, format and/or display raw or processed data in various formats.

Figure 2:
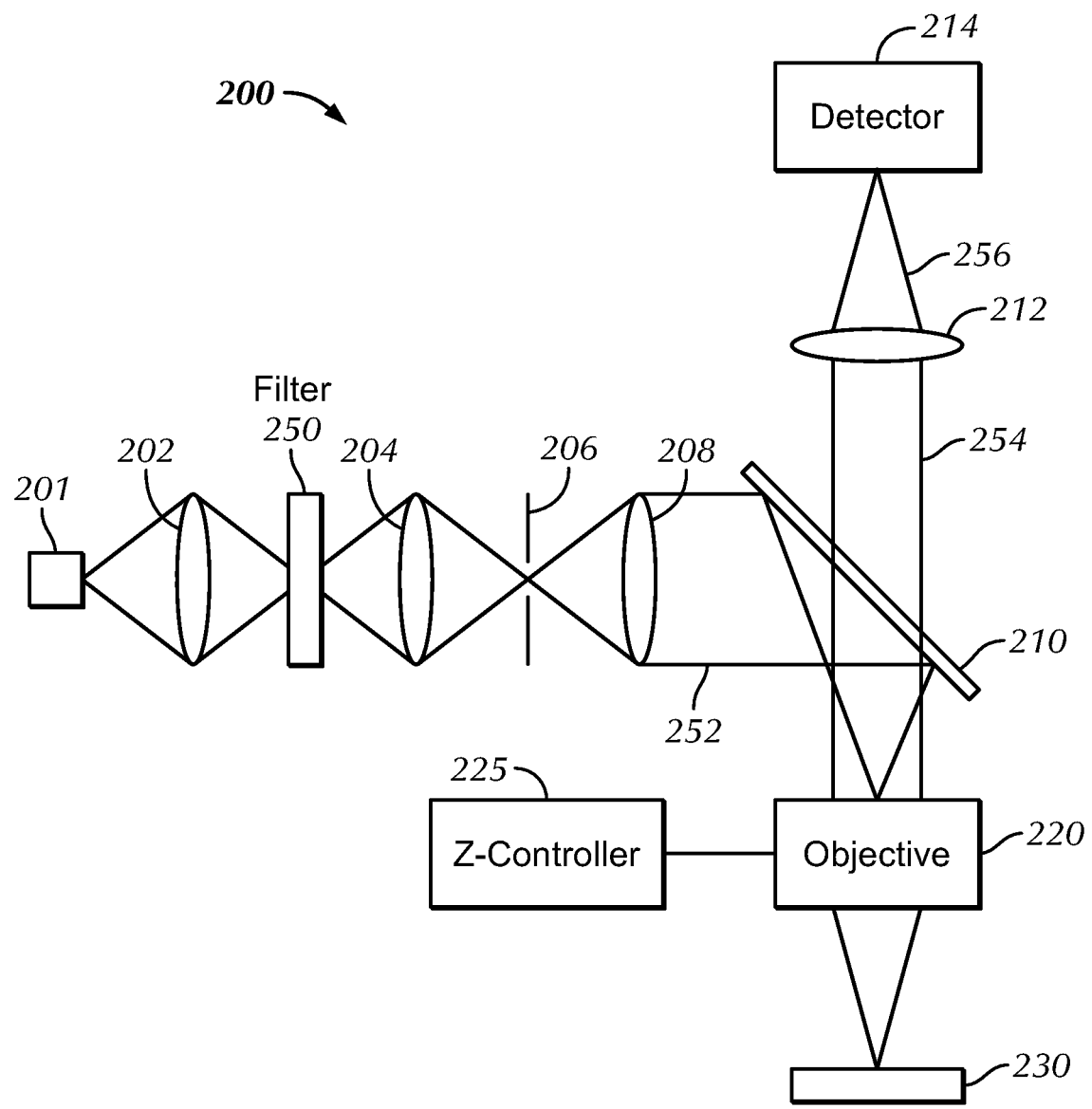
FIG. 2 is a block diagram of a surface profiler including a Mirau objective, under an embodiment.

FIG. 2 is a block diagram of an electro-optical system 200 comprising a surface profiler including a Mirau objective, under an embodiment. The electro-optical system 200 includes a light source configured to form an aperture image. The light source (e.g., white light, LED, Xenon lamp, Halogen lamp, laser, etc.) of an embodiment includes a radiation source 201 and a first condensing lens 202. The first condensing lens 202 focuses incident light from the source 201 onto an input of a filter 250. Light output from the filter 250 is optically coupled to a second condensing lens 204, which focuses the incident light onto an aperture 206 (e.g., circular, rectangular, etc.). Light passing through aperture 206 impinges on a collimator lens 208, which outputs collimated light 252. The size and configuration of the aperture 206, which is selected as appropriate to a configuration of the system 200, determines the field angles in the collimated light sections of the optical system and the orientation is chosen to allow an aperture image to be projected onto the sample 230. The filter 250 includes one or more different filter types as described in detail herein.

Light output from the collimator lens 208 is incident upon an optical device 210 that is configured to divide the incident light. The optical device 210 of an embodiment is a beam splitter 210, but is not so limited. The light is transmitted through the optical device 210 to an objective 220, which in this embodiment is a Mirau interferometry objective 220 available from Nikon Corporation. The objective 220 of various alternative embodiments includes a Michelson interferometry objective and a Linnik interferometry objective, to name a few.

The Mirau objective 220 of this system 200 includes a z-stage coupled or connected to a z-controller 225 configured to control z-axis movement of the objective 220 relative to the sample 230 (when present) or stage. The objective 220 is configured to focus and/or couple light to a reference component (not shown) that is a component of the objective 220 but is not so limited. A first portion of the light focused onto the reference component is reflected from the reference component and passes back through the objective 220 and returns to the optical device 210 where it forms a first aperture image. A second portion of the light focused onto the reference component passes through the reference component, which is configured to illuminate the surface of the sample 230 (when present) by focusing the second portion of the light onto the surface of the sample 230. The light emitted or reflected from the surface of the sample 230 returns through the objective 220 and forms a second aperture image on the optical device 210.

The first and second images or beams returning from the sample and the reference component recombine and interfere at the optical device 210. Light 254 from the optical device 210 is incident on a lens 212 where images are formed of the interference pattern of the reference mirror surface and the sample surface, and the lens 212 redirects the aperture images 256 to a detector 214 (e.g., charge coupled device (CCD) camera, complementary metal-oxide semiconductor (CMOS) camera, etc.). The detector of an embodiment includes and/or is coupled or connected to a processor configured to process the data from the detector and, optionally, format and/or display raw or processed data in various formats.

Figure 3:
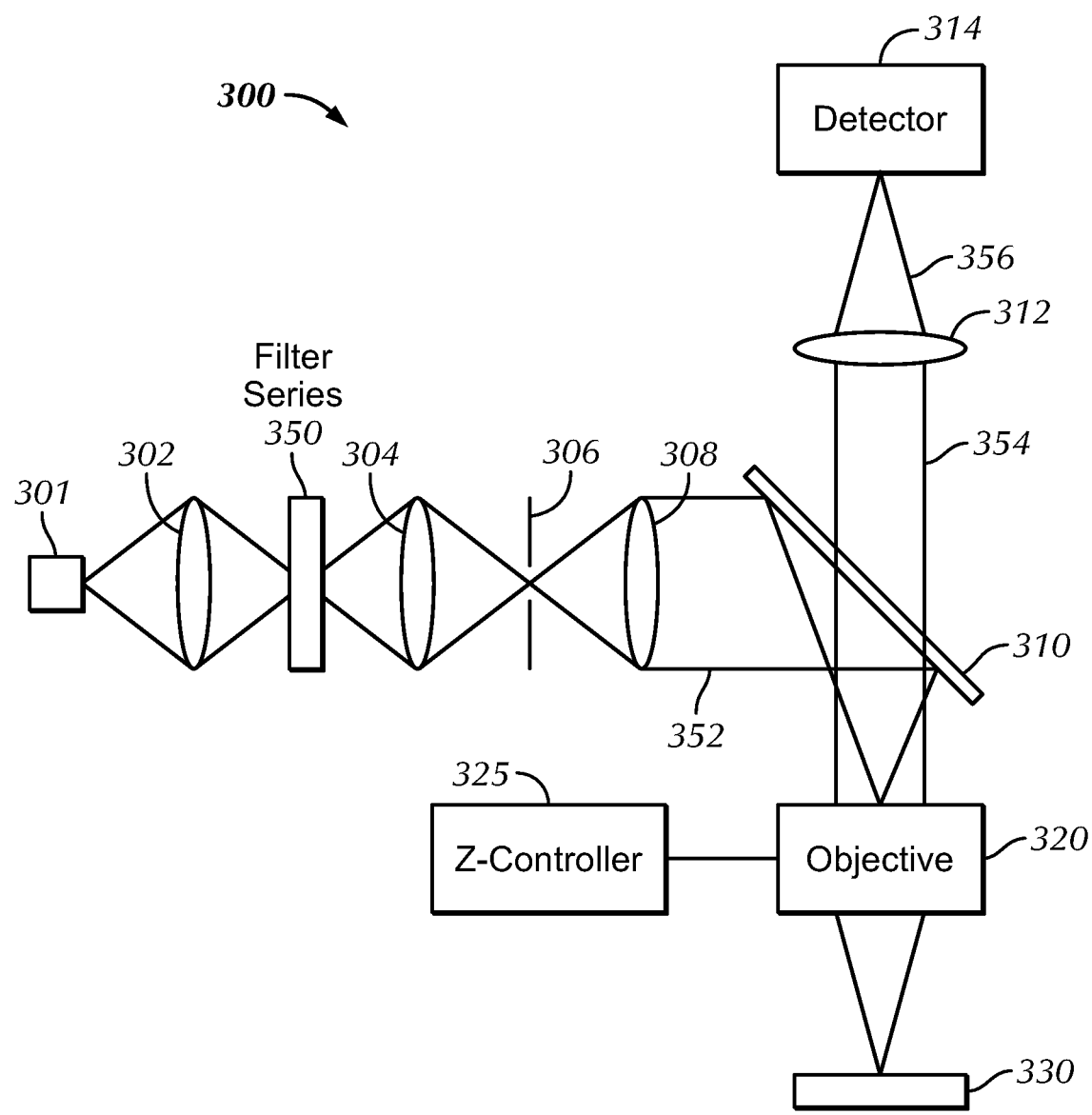
FIG. 3 is a block diagram of a surface profiler including a filter series, under an embodiment.

As described herein, the filter of an embodiment includes one or more different filter types. For example, the filter includes a series of narrow band filters. FIG. 3 is a block diagram of an electro-optical system 300 comprising a surface profiler including a filter series 350, under an embodiment. The electro-optical system 300 includes a light source configured to form an aperture image. The light source (e.g., white light, LED, Xenon lamp, Halogen lamp, laser, etc.) of an embodiment includes a radiation source 301 and a first condensing lens 302. The first condensing lens 302 focuses incident light from the source 301 onto an input of a filter 350. Light output from the filter 350 is directed at a second condensing lens 304, which focuses the incident light onto an aperture 306 (e.g., circular, rectangular, etc.). Light passing through aperture 306 impinges on a collimator lens 308, which outputs collimated light 352. The size and configuration of the aperture 306, which is selected as appropriate to a configuration of the system 300, determines the field angles in the collimated light sections of the optical system and the orientation is chosen to allow an aperture image to be projected onto the sample 330.

The filter comprises a filter series 350 configured so the light source of this embodiment is spectrally filtered by a series of narrow band filters 350 following the first condensing lens 302. The narrow band filters 350 comprise 5 nm to 25 nm full-bandwidth filters, for example, but are not so limited. The series of spectral filters 350 of an embodiment, each of which is transparent to a particular wavelength of light, are placed around the periphery of a rotating filter wheel assembly (not shown). By rotating the filter wheel, the different spectral filters are interchanged so that light of a selected wavelength passes through the filter, whereby a corresponding series of collimated monochromatic light beams are produced at an output of the filter 350. While a filter wheel is described in this example embodiment, any mechanism can be used to exchange filters of the filter series to realize light of different respective wavelengths. The wavelengths of the output collimated monochromatic light beams 352 range from approximately 300 nm to 950 nm, for example, but are not so limited.

In an embodiment, the filter wheel assembly is configured to generate electronic signal(s) to serve as a timing reference for a digitizing circuit coupled or connected to the filter 350. The generated signal(s) indicates the beginning of a filter wheel revolution and, additionally, indicates the beginning of each filter period.

Light output 352 from the collimator lens 308 is incident upon an optical device 310 that is configured to divide the incident light. The optical device 310 of this example embodiment is a beam splitter 310, but is not so limited. The light is transmitted through the optical device 310 to an objective 320, which in this embodiment is a Mirau interferometry objective 320 available from Nikon Corporation. The objective 320 is not limited to a Mirau objective, and the objective of various alternative embodiments includes a Michelson interferometry objective and a Linnik interferometry objective, to name a few.

The Mirau objective 320 of this system 300 is configured to focus and/or couple light to a reference component (not shown) that is a component of the objective 320 but is not so limited. The objective includes and/or is coupled or connected to a z-stage, and the z-stage is coupled or connected to a z-controller 325 configured to control z-axis movement of the objective 320 relative to the sample 330 (when present) or stage. A first portion of the light focused onto the reference component is reflected from the reference component and passes back through the objective 320 and returns to the optical device 310 where it forms a first aperture image. A second portion of the light focused onto the reference component passes through the reference component, which is configured to illuminate the surface of the sample 330 (when present) by focusing the second portion of the light onto the surface of the sample 330. The light emitted or reflected from the surface of the sample 330 returns through the objective 320 and forms a second aperture image on the optical device 310.

The first and second images returning from the sample and the reference component recombine and interfere at the optical device 310. Light 354 from the optical device 310 is incident on a lens 312 where images are formed of the interference pattern of the reference component surface and the sample surface, and the lens 312 redirects the aperture images 356 to a detector 314 (e.g., charge coupled device (CCD) camera, complementary metal-oxide semiconductor (CMOS) camera, etc.). The detector of an embodiment includes and/or is coupled or connected to a processor configured to process the data from the detector and, optionally, format and/or display raw or processed data in various formats.

Figure 4:
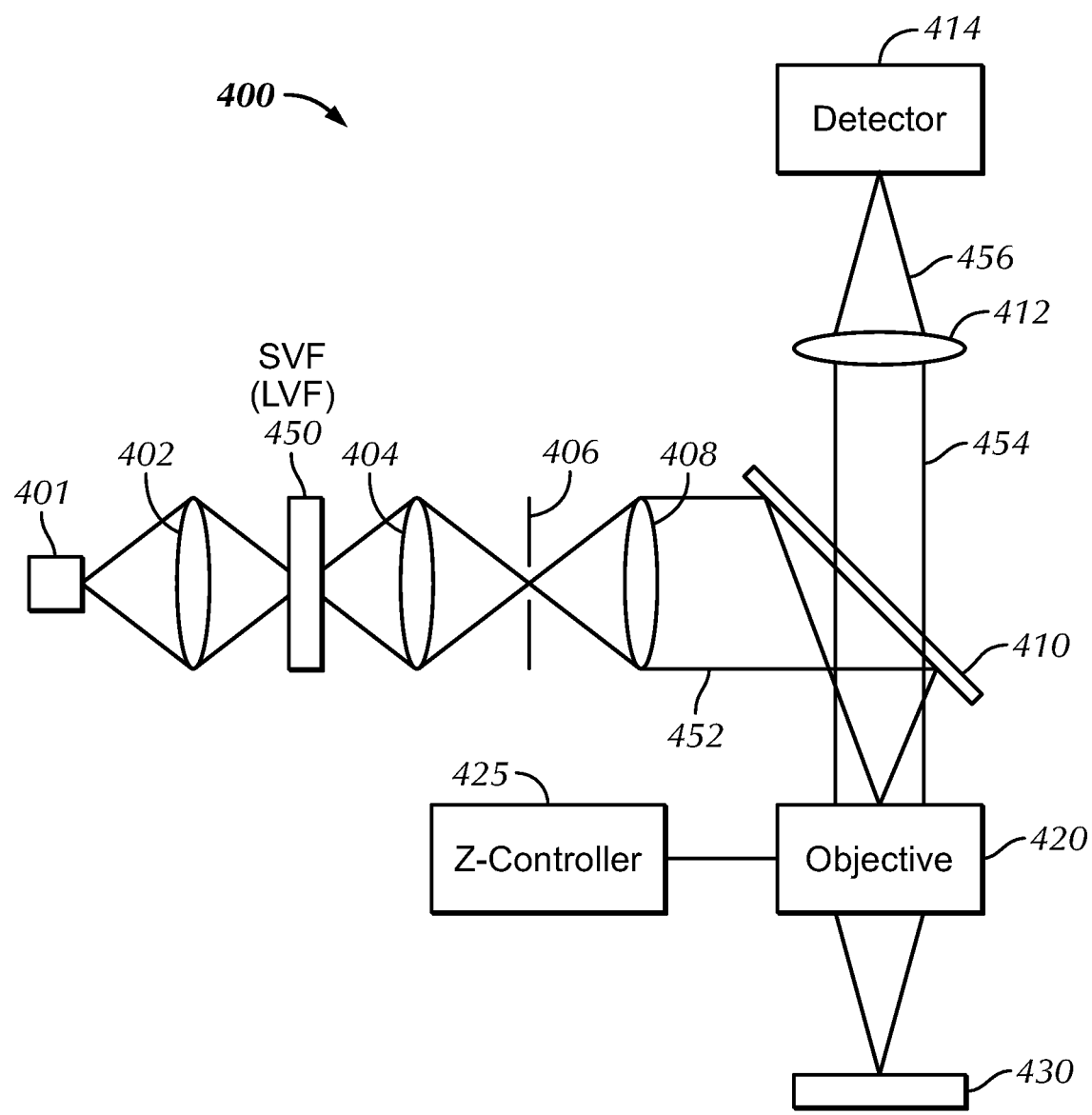
FIG. 4 is a block diagram of a surface profiler including a spatially variable filter (SVF), under an embodiment.

Electro-optical systems of an embodiment comprise a filter realized with one or more spatially variable filters (SVFs). A spatially variable filter (SVF) is an optical interference filter having spectral properties that vary as a function of position (e.g., linear, parabolic, etc.) on the filter, compared to a conventional optical filter with spectral functionality configured to be identical at any location or point on the filter. FIG. 4 is a block diagram of an electro-optical system 400 comprising a surface profiler including a SPV, under an embodiment. The system 400 includes a light source configured to form an aperture image. The light source (e.g., white light, LED, Xenon lamp, Halogen lamp, laser, etc.) of an embodiment includes a radiation source 401 and a first condensing lens 402. The first condensing lens 402 focuses incident light from the source 401 onto an input of a filter 450. Light output from the filter 450 is directed at a second condensing lens 404, which focuses the incident light onto an aperture 406 (e.g., circular, rectangular, etc.). Light passing through aperture 406 impinges on a collimator lens 408, which outputs collimated light 452. The size and configuration of the aperture 406, which is selected as appropriate to a configuration of the system 400, determines the field angles in the collimated light sections of the optical system and the orientation is chosen to allow an aperture image to be projected onto the sample 430.

The filter includes a spatially variable filter (SVF) 450, which in this example embodiment is a linear variable filter (LVF) 450. Generally, as described above, a spatially variable filter (SVF) is an optical interference filter having varying spectral functionality along one direction of the filter, compared to a conventional optical filter with spectral functionality configured to be identical at any location of the filter. While the example embodiments described herein include an SPV that is a linear variable filter (LVF), the embodiments are not limited to LVFs but instead can include any type of SVF as appropriate to a configuration of the system.

Light output from the first condensing lens 402 is incident upon an input of the linear variable filter (LVF) 450 where it is filtered to produce a corresponding series of collimated monochromatic light beams 452 at an output of the LVF. An embodiment is configured to illuminate the SVF input with light having a beam diameter of approximately 1 mm (e.g., cut-off band having width of approximately 10 nm), but is not so limited. The LVF of embodiments described herein include one or more LVFs in various combinations, as described in detail herein. The wavelengths of the collimated monochromatic light beams 452 output from the LVF 450 range from approximately 300 nm to 850 nm but are not so limited. The LVF is described in detail herein.

Light output from the LVF 450 is directed at a second condensing lens 404, which focuses the incident light onto an aperture 406 (e.g., circular, rectangular, etc.). Light passing through aperture 406 impinges on a collimator lens 408, which outputs collimated light 452 that is incident upon an optical device 410 configured to divide the incident light. The optical device 410 of an embodiment includes a beam splitter 410, but is not so limited. The light is transmitted through the optical device 410 to an objective 420, which in this embodiment is a Mirau interferometry objective 420 available from Nikon Corporation. The objective 420 is not limited to a Mirau objective, and the objective of various alternative embodiments includes a Michelson interferometry objective and a Linnik interferometry objective, to name a few.

The light is focused by the objective 420 onto a reference component (not shown) but is not so limited. A first portion of the light focused onto the reference component is reflected from the reference component and passes back through the objective 420 and returns to the optical device 410 where it forms a first aperture image. A second portion, or remainder, of the light focused onto the reference component passes through the reference component, which is configured to illuminate the surface of the sample 430 (when present) by focusing the second portion of the light onto the surface of the sample 430. The light emitted or reflected from the surface of the sample 430 returns through the objective 420 and forms a second aperture image on the optical device 410.

The first and second images or beams returning from the sample and the reference component recombine and interfere at the optical device 410. Light 454 from the optical device 410 is incident on a lens 412 where images are formed of the interference pattern of the reference component surface and the sample surface by a lens 412, which redirects the aperture images to a detector 414 (e.g., charge coupled device (CCD) camera, complementary metal-oxide semiconductor (CMOS) camera, etc.). The detector of an embodiment includes and/or is coupled or connected to a processor configured to process the data from the detector and, optionally, format and/or display raw or processed data in various formats.

The term "linear" in LVF relates to the spectral properties that vary generally linearly, thereby making the wavelength variation a linear function of the position on the filter. The wavelength variation of an embodiment is achieved by an interference coating that is wedged or graduated in one direction, creating a linear shift of the center or edge wavelength along the same direction of the filter. The LVFs of example embodiments are rectangular types where the wavelength characteristic changes along the longitudinal direction, but are not so limited. The LVFs of alternative example embodiments include circular variable filters for which the variation is obtained by rotating the filters. In other alternative configurations, tunability of the LVF is obtained by changing the angle of incidence.

A single LVF can replace one or more dedicated filters in an optical instrument, and each LVF is configured to adjust the position of the edge by sliding the filter. The LVFs are coated on single quartz substrates for minimal auto-fluorescence and high laser damage threshold, and are coated with ultra-hard surface coatings (UHC), but are not so limited. In contrast to conventional absorptive or induced transmission filters and soft coated filters, which are susceptible to damage when used with high power sources, the LVFs of an embodiment include a hard-coating non-absorbing technology, such as all-dielectric metal-oxides or refractory metal-oxides and quartz constructions, that withstand damage by high optical power sources. Furthermore, the high precision multi-layer coatings provide very high edge steepness along with around 90 percent transmission efficiency and typically better than 40 dB out-of-band suppression.

The LVF of an embodiment includes a combination of long-wave pass and short-wave pass interference filters. More particularly, this combination LVF configuration includes a Linear Variable Short Wave Pass filter (LVSWP) and a Linear Variable Long Wave Pass filter (LVLWP) to realize a variable band-pass filter. The filters of embodiments including the combined LVF configuration (LVSWP and LVLWP) operate in a spectral range from 300 nm to 850 nm, but are not so limited. In general, interference filters have a number of advantages in selecting passbands or rejection of various wavelengths. The two most prominent advantages being that the spectral shape and the grade of rejection are designable. They can comprise up to approximately 150 stacked layers of thin films of varying optical thickness "nd", where variable "n" represents refractive index and variable "d" represents thickness of the film. It is thus possible to create a variable long-wave pass filter by varying the layer thickness along the filter by a linear wedge. Likewise a short-wave pass filter can be constructed by using the short wave cut-off of the quarter wave stack and again modifying thicknesses to give a uniform transmission over a wavelength range limited in this case by the arrival of second order interference effects.

The variable-wavelength filter stage of an embodiment combines the LVSWP and the LVLWP filters with a motorized translation stage, which is controlled by software to be driven synchronously with the diffraction grating of the monochromator. Thus, when properly calibrated, the filters are always positioned in the beam path in such a way that the wavelength selected by the grating lies near the cut-off wavelength of the respective filter, while still in the region of maximum transmission. In the case of the LVLWP, the very sharp edge and strong reflection then eliminates any stray light at wavelengths shorter than the cut-off. Depending upon the nature of the measurements and the sensitivity to scattered light, an embodiment combines the LVLWP with the LVSWP to create a band-pass filter realizing finely tunable bandwidths as small as the order of 10 nm without loss in maximum transmission. Further, the LVLWP and/or the LVSWP filters of an embodiment are angled to eliminate reflections between the filters, but the embodiment is not so limited.

Each of the filters can be used separately, and combining the LVLWP and LVSWP realizes band-pass filters that can be tuned continuously with center wavelengths from approximately 300 nm to 850 nm, with the added benefit of tunable bandwidth. The LVF configuration provides enhanced transmittance and edge steepness, and the filters offer blocking better than OD3 over the complete reflectance range (blocking can be increased to beyond OD5 by placing another linear variable filter in series).

Referring to FIG. 4, the LVF 450 of the system 400 includes a single tunable bandpass LVF for which the output wavelength is selected according to the spatial position illuminated on the filter. The bandpass LVF is configured by combining two edgepass LVFs, one LVLWP and one LVSWP, to create a tunable pass band. By moving both filters together relative to each other, the central wavelength can be continuously adjusted and by moving them relative to one another the bandwidth of the filter can also be tuned. In imaging applications this enables optimization of the filter to maximize efficiency of the imaging. Using two of these fully tunable LVF bandpass filters together, because the LVFs have intrinsically high transmission efficiency, enables maximum tunable power from a light source 401 including a supercontinuum light source. The LVFs as described herein are available from Delta Optical Thin Film A/S, for example, but are not so limited.

Figure 5:
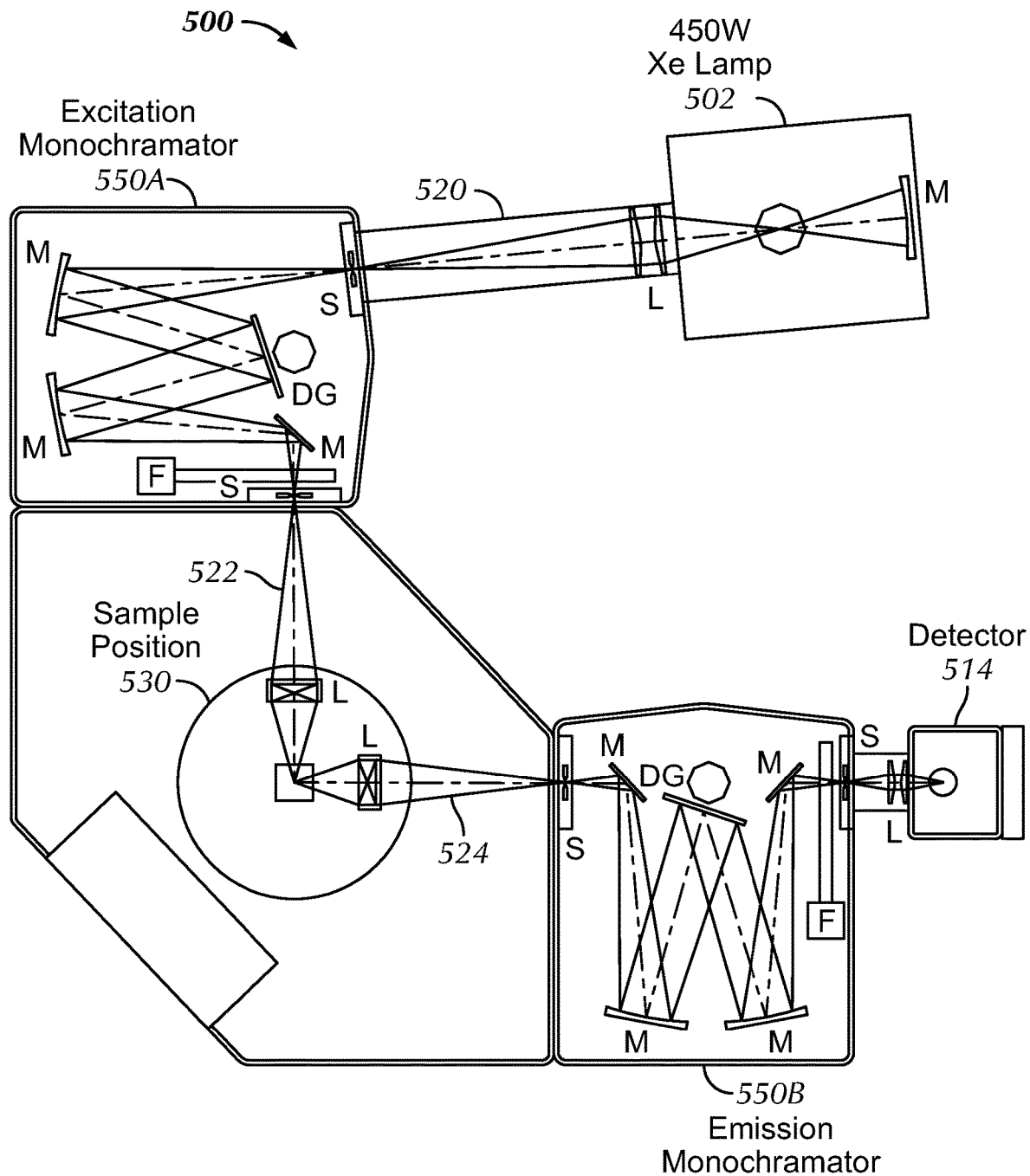
FIG. 5 is a block diagram of a surface profiler configuration having two linear variable filters (LVFs) positioned at different points in the optical path, under an embodiment.

The bandpass LVF described herein can include two separate LVFs positioned at different points in the optical path. Generally, FIG. 5 is a block diagram of an optical system 500 configuration having two linear variable filters (LVFs) 550A, 550B positioned at different points in the optical path, under an embodiment. This example configuration includes a light source 502 (e.g., 450 Watt Xenon Lamp, etc.) optically coupled 520 to the input of a first LVF 550A (e.g., excitation monochromator). The output of the first LVF 550A is optically coupled via an excitation optical path 524 to a stage 530 configured to receive and secure a sample under test. The emission optical path 524 from the stage 530 is optically coupled to the input of a second LVF 550B (e.g., emission monochromator). The output of the second LVF 550B is optically coupled 526 to the detector 514. One or more of the optical path 520 from the light source, the excitation optical path 524, the emission optical path 524, and the optical path 526 to the detector 514 includes a lens L configuration as appropriate to the configuration of the system 500.

The first LVF 550A and the second LVF 550B of an embodiment operate in combination to provide the LVF bandpass filter. The first LVF 550A includes a slit S, numerous mirrors M, a diffraction grating DG, and a variable filter stage F, as appropriate to the configuration of the system 500. Likewise, the second LVF 550B includes a slit S, numerous mirrors M, a diffraction grating DG, and a variable filter stage F, as appropriate to the configuration of the system 500.

In an embodiment of the LVF bandpass filter, the variable filter stage F of the first LVF 550A is configured as a linear variable long wave pass filter (LVLWP) and the variable filter stage F of the second LVF 550B is configured as a linear variable short wave pass filter (LVSWP). In an alternative embodiment of the LVF bandpass filter, the variable filter stage F of the first LVF 550A is configured as a linear variable short wave pass filter (LVSWP) and the variable filter stage F of the second LVF 550B is configured as a linear variable long wave pass filter (LVLWP).

A configuration of the LVSWP filter of an embodiment includes but is not limited to the following: edge tuned from 320 nm to 850 nm, blocking up to 684 nm when edge at lowest wavelength (relatively lower near-edge blocking, relatively higher UV transmittance); edge tuned from 320 nm to 850 nm, blocking up to 684 nm when edge at lowest wavelength (relatively deeper near-edge blocking, relatively lower UV transmittance.

A configuration of the LVLWP filter of an embodiment includes but is not limited to the following: edge tuned from 310 nm to 850 nm, blocking down to 340 nm when edge at highest wavelength (relatively less steep edge and narrower blocking range); edge tuned from 310 nm to 850 nm, blocking down to 190 nm when edge at highest wavelength (relatively steeper edge and broader blocking range).

Figure 6:
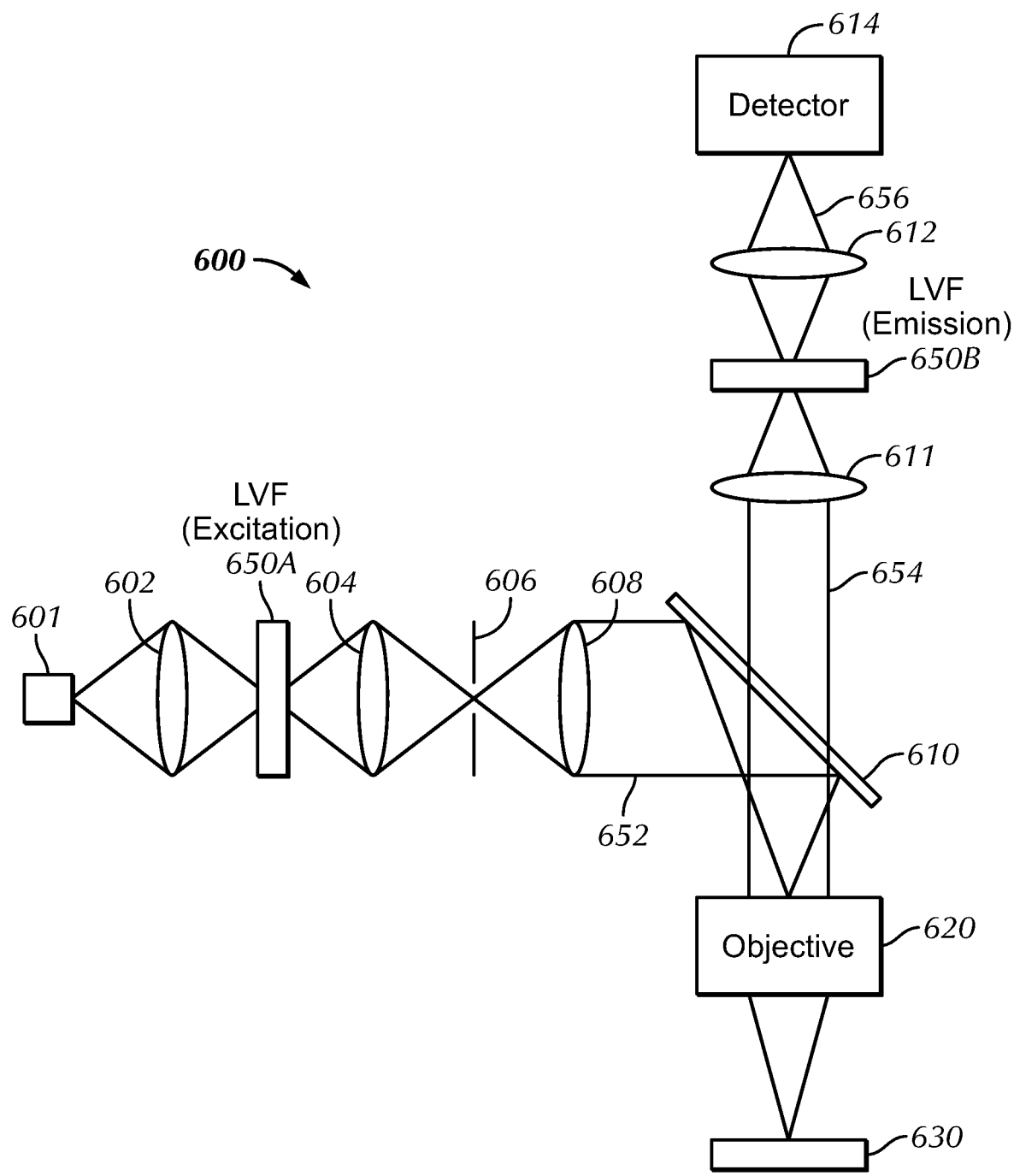
FIG. 6 is another block diagram of a surface profiler configuration having two linear variable filters (LVFs) positioned at different points in the optical path, under an embodiment.

Regarding bandpass filter configurations, embodiments may include but are not limited to different Linear Variable Bandpass Filters as follows: center wavelength range 450 nm to 880 nm, bandwidth approximately 2% of center wavelength, transmission 60% to 90%, blocking range 200 nm to 1150 nm, blocking level OD4, size 24 mm×36 mm; center wavelength range 450 nm to 850 nm, bandwidth approximately 4% of center wavelength, transmission 70% to 90%, blocking range 200 nm to 1100 nm, blocking level OD4, size 25 mm×25 mm; center wavelength range 800 nm to 1000 nm, bandwidth approximately 0.6% of center wavelength, transmission greater than 70%, blocking range 200 nm to 1200 nm, blocking level OD4, size 19 mm×8 mm; center wavelength range 800 nm to 1000 nm, bandwidth approximately 1% of center wavelength, transmission greater than 70%, blocking range 200 nm to 1200 nm, blocking level OD4, size 19 mm×8 mm. More specifically, FIG. 6 is another block diagram of an optical system configuration 600 having a SVF comprising two linear variable filters (LVFs) 650A, 650B positioned at different points in the optical path, under an embodiment. The system 600 includes a light source configured to form an aperture image. The light source (e.g., white light, LED, Xenon lamp, Halogen lamp, laser, etc.) of an embodiment includes a radiation source 601 and a first condensing lens 602. The first condensing lens 602 focuses incident light from the source 601 onto an input of a filter 650. Light output from the filter 650 is directed at a second condensing lens 604, which focuses the incident light onto an aperture 606 (e.g., circular, rectangular, etc.). Light passing through aperture 606 impinges on a collimator lens 608, which outputs collimated light 652. The size and configuration of the aperture 606, which is selected as appropriate to a configuration of the system 600, determines the field angles in the collimated light sections of the optical system and the orientation is chosen to allow an aperture image to be projected onto the sample 630. While this example embodiment includes SPVs comprising a linear variable filter (LVF), the embodiments are not limited to LVFs but instead can include any type of SVF as appropriate to a configuration of the system.

The light 609 from the first condensing lens 602 is input to a first LVF 650A (excitation) where it is filtered to produce a corresponding series of collimated monochromatic light beams 652 at an output of the first LVF 650A.

The wavelengths of these collimated monochromatic light beams 652 range from approximately 300 nm to 850 nm but are not so limited. The configuration of the first LVF 650A is described in detail herein.

Light output from the first LVF 650A is directed at a second condensing lens 604, which focuses the incident light onto an aperture 606 (e.g., circular, rectangular, etc.). Light passing through aperture 606 impinges on a collimator lens 608, which outputs collimated light 652 that is incident upon an optical device 610 configured to divide the incident light. The optical device 610 of an embodiment includes a beam splitter 610, but is not so limited. The light is transmitted through the optical device 610 to an objective 620, which includes one or more different objective types as described in detail herein. The light is focused by the objective 620 onto a reference component but is not so limited. A first portion of the light focused onto the reference component is reflected from the reference component and passes back through the objective 620 and returns to the optical device 610 where it forms a first aperture image. A second portion of the light focused onto the reference component passes through the reference component, which is configured to illuminate the surface of the sample 630 (when present) by focusing the second portion of the light onto the surface of the sample 630. The light emitted or reflected from the surface of the sample 630 returns through the objective 620 and forms a second aperture image on the optical device 610.

The first and second images or beams returning from the sample and the reference component are projected onto the optical device where they recombine and interfere to produce an interference pattern. Images are formed of the interference pattern of the reference component surface and the sample surface by the optical device 610, which redirects the image 654 to a lens 611. The lens 611 is configured to focus light from the optical device 610 onto the input of a second LVF 650B (emission) where it is filtered to produce a corresponding series of collimated light beams 654 at an output of the second LVF 650B. The wavelengths of these collimated light beams 654 range from approximately 300 nm to 850 nm but are not so limited.

The first LVF 650A and the second LVF 650B of an embodiment operate in combination to provide the LVF bandpass filter. In an embodiment of the LVF bandpass filter, the first LVF 650A is configured as a linear variable long wave pass filter (LVLWP) and the second LVF 650B is configured as a linear variable short wave pass filter (LVSWP). In an alternative embodiment of the LVF bandpass filter, the first LVF 650A is configured as a linear variable short wave pass filter (LVSWP) and the second LVF 650B is configured as a linear variable long wave pass filter (LVLWP).

The output of the second LVF 650B is optically coupled to a final collimator lens 612, which is configured to focus light 656 comprising an image of the interference pattern onto a detector 614 (e.g., CCD camera detector array, CMOS camera, etc.). The detector of an embodiment includes and/or is coupled or connected to a processor configured to process the data from the detector and, optionally, format and/or display raw or processed data in various formats.

The LVF of an alternative embodiment includes the LVLWP and the corresponding LVSWP, as described herein, and optionally a Linear Variable Dichroic. The dichroic filter, or interference filter, is an accurate color filter used to selectively pass light of a small or limited range of colors while reflecting other colors. Embodiments may include a dichroic filter or slide having an edge tuned from approximately 320 nm to 760 nm. A dichroic filter as described herein is available from Delta Optical Thin Film A/S, for example, but is not so limited. Alternative embodiments can include order-sorting filters for filtering higher orders of diffractive optics and suppression of background noise.

Figure 7:
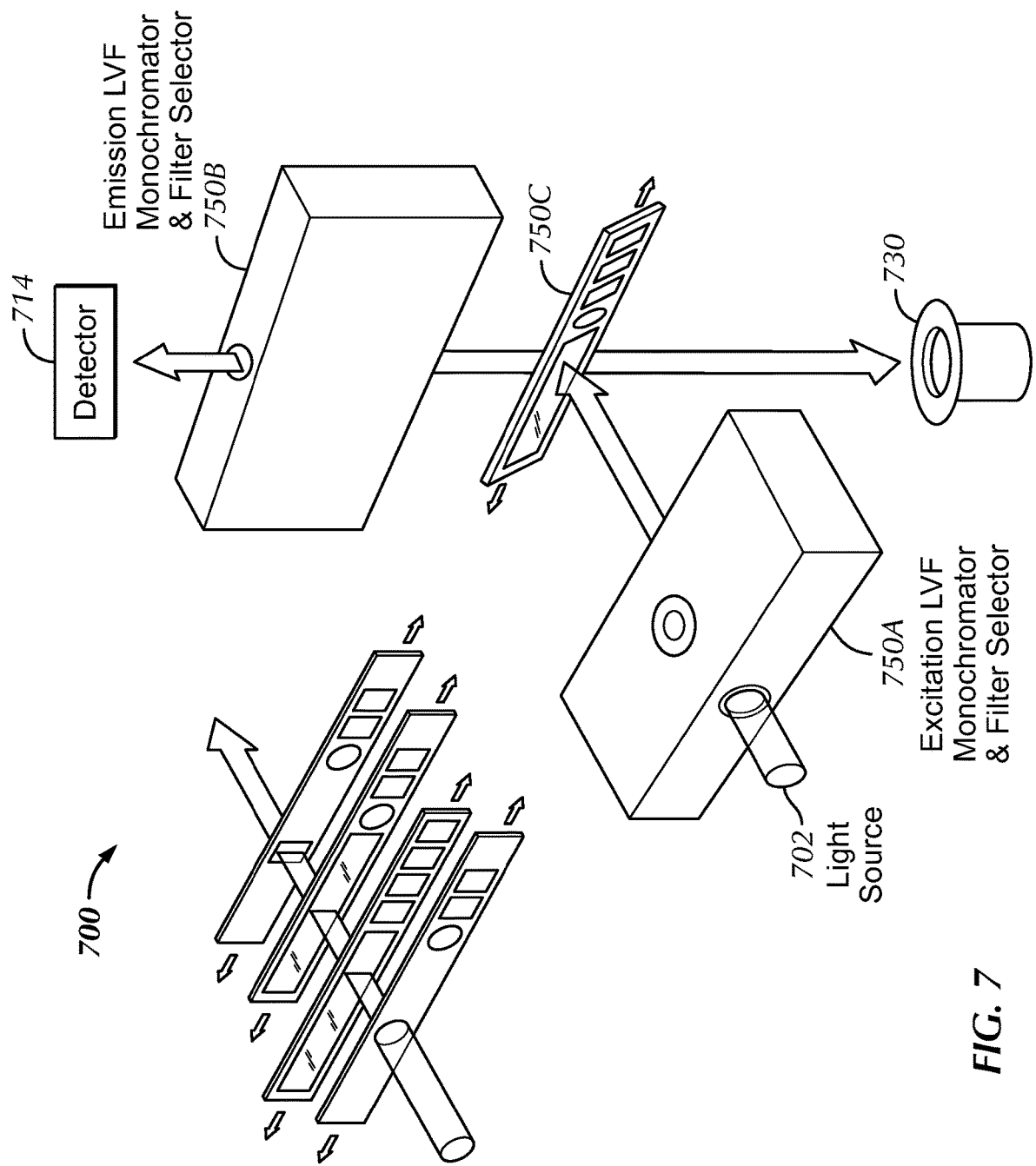
FIG. 7 is a block diagram of a surface profiler configuration including two LVFs and a dichroic filter, under an alternative embodiment.

FIG. 7 is a block diagram of an electro-optical system 700 configured to include two LVFs 750A, 750B and a dichroic filter 750C, under an alternative embodiment. The light source 702 of this embodiment is optically coupled to the first LVF 750A (excitation) where it is filtered to produce a corresponding series of collimated monochromatic light beams at an output of the first LVF 750A. The light output of the first LVF 750A is optically coupled to the dichroic filter 750C, and then optically coupled from the dichroic filter 750C to the sample 730. The dichroic filter 750C of this example embodiment is configured and/or positioned for use as an optical device or reflector (e.g., see FIG. 1), or beam splitter, but the embodiment is not so limited. Light emitted or reflected from the surface of the sample 730 is optically coupled to an input of a second LVF 750B (emission) via the dichroic filter 750C. The second LVF 750B is configured to filter the received light signal to produce a corresponding series of collimated monochromatic light beams at an output of the second LVF 750B. The output of the second LVF 750B is optically coupled to a detector 714 as described in detail herein. Additional elements of the electro-optical system 700 are as appropriate to the configuration of embodiments described in detail herein.

The first LVF 750A and the second LVF 750B of an embodiment operate in combination to provide the LVF bandpass filter. In an embodiment of the LVF bandpass filter, the first LVF 750A is configured as a linear variable long wave pass filter (LVLWP) and the second LVF 750B is configured as a linear variable short wave pass filter (LVSWP). In an alternative embodiment of the LVF bandpass filter, the first LVF 750A is configured as a linear variable short wave pass filter (LVSWP) and the second LVF 750B is configured as a linear variable long wave pass filter (LVLWP).

The electro-optical system of an embodiment is configured for use with various types of light sources (e.g., white light, LED, laser, xenon lamp, halogen lamp, light emitting diode (LED), etc.), as described in detail herein. For example, the source in an embodiment is a supercontinuum source. Supercontinuum generation is a process in which laser light is converted to light with a very broad spectral bandwidth (i.e., low temporal coherence), whereas the spatial coherence usually remains high. The spectral broadening is generally accomplished by propagating optical pulses through a strongly nonlinear device. For example, an intense (amplified) ultrashort pulse is directed through a piece of bulk glass. Alternatively, pulses can be sent having much lower pulse energy through an optical fiber, having a much higher nonlinearity and also a waveguide structure which ensures a high beam quality.

The supercontinuum source of an embodiment is used in combination with a high power transmission filter but is not so limited. An example of the high power transmission filter is the SuperChrome filter, available from Fianium. The SuperChrome filter is a single-channel transmission filter, which allows the user to both select the wavelength and tune the bandwidth of a supercontinuum source. The filter operates over the entire visible spectrum from below 400 nm to greater than 850 nm. This filter offers a typical transmission of greater than 80%, with maximum performance achieved using filter bandwidths ranging from 8 nm to more than 50 nm, for example. When the filter is coupled to a supercontinuum source (e.g., Fianium SC400, SC450, SC 480, etc.), more than 100 mW of power, tunable across the visible range, is available in a 25 nm bandwidth. The unit provides levels of out of band suppression of approximately 40 dB. SuperChrome filter enhances the flexibility of the supercontinuum laser output offering a tunable laser source at any user-defined wavelength.

The light source of an alternative embodiment includes a broadband light source, which in an example includes the broadband light source described in U.S. patent application Ser. No. 13/742,782. The broadband light source efficiently combines the light from one or more LEDs with a low-color-temperature incandescent lamp, thereby realizing a high-lifetime broadband light source suitable for low-power applications. As an example, the light-combining apparatus that combines light from a white-light LED with light from a low-color-temperature incandescent lamp using a fiber-optic coupler. The apparatus includes a two-input fiber optic coupler coupled to a white-light LED and a low-color-temperature incandescent lamp. The fiber-optic coupler of an embodiment is a dual-branch fiber-optic light guide available from Edmund Optics (part number NT54-199), or a fused coupler such as those available from OZ Optics, but is not so limited.

In this embodiment, the output of white-light LED and the output of low-color-temperature incandescent lamp are directed into the two input legs of the two-input fiber optic coupler. The resultant spectrum emitting from the fiber-optic coupler is the combined spectral output of the white-light LED source and the low-color-temperature incandescent lamp source. The output emitted from the fiber-optic coupler is optically coupled to the linear variable filter (LVF) as described in detail herein.

The electro-optical systems described herein are calibrated before and during measurement operations using various conventional calibration procedures. As an example, the calibration process of an embodiment includes a real-time calibration as described in U.S. patent application Ser. No. 13/743,210. Embodiments of this calibration process include an apparatus that injects light from a calibration source into the spectrometer. The calibration system generally includes a calibration light source, or calibration source, coupled between an output of a controller and an input of a spectrometer. In this embodiment, a neon lamp is the calibration light source, but the embodiment is not so limited. The calibration light source is controlled (turned on and off) by the controller. The output of the calibration light source is collected by a calibration optical fiber and transmitted to an input slit of the spectrometer. The spectrometer receives the light that it is to measure, referred to herein as the light-under-test, via a spectrometer-input optical fiber that is coupled between the light-under-test and the spectrometer.

Generally, the spectrometer calibration of this embodiment comprises coupling a calibration light source to an input slit of a spectrometer using a calibration optical fiber. The method includes, in addition to the calibration optical fiber, coupling an input optical fiber to the input slit of the spectrometer. The input optical fiber is coupled to a light-under-test. The method includes activating the calibration light source and simultaneously minimizing the light-under-test. The method includes acquiring a calibration spectrum from the spectrometer. The calibration spectrum results from light output of the calibration light source being received at the spectrometer. Using the calibration spectrum, the method includes generating a set of calibration coefficients.

Embodiments include a system comprising a light source, and a retention device configured to receive and retain a sample for measurement. The system includes a detector. An optical path couples light between the light source, the sample when present, and the detector. The system includes an optical objective configured to couple light from the light source to the sample when present, and couple reflected light to the detector. The system includes a controller configured to automatically control at least one of focus and beam path of the light directed by the optical objective to the sample when present. The system includes a spatially variable filter (SVF) positioned in the optical path. The SVF is configured to have spectral properties that vary as a function of illuminated position on the SVF.

Embodiments include a system comprising: a light source; a retention device configured to receive and retain a sample for measurement; a detector, wherein an optical path couples light between the light source, the sample when present, and the detector; an optical objective configured to couple light from the light source to the sample when present, and couple reflected light to the detector; a controller configured to automatically control at least one of focus and beam path of the light directed by the optical objective to the sample when present; and a spatially variable filter (SVF) positioned in the optical path, wherein the SVF is configured to have spectral properties that vary as a function of illuminated position on the SVF.

The detector comprises a spectrometer.

The detector comprises a processing device configured to generate data representing a surface of the sample when present.

The detector is configured to output data representing at least one of a film thickness and a surface profile of the sample.

The controller is coupled to the optical objective and configured to control focus of the optical objective by controlling a vertical position of the optical objective relative to the retention device.

The controller is configured to automatically control differences in the focus to determine a surface profile of the sample.

The detector is configured to output data representing the surface profile. The controller is coupled to the retention device and configured to control focus of the light directed from the optical objective by controlling a vertical position of the retention device relative to the optical objective.

The system includes an optical director positioned in the optical path, wherein the optical director is configured to at least one of couple light from the light source to the optical objective and couple reflected light from the sample when present to the detector.

The optical director comprises at least one of a plurality of mirrors, a beamsplitter, a reflector, and an off-axis reflector.

The system includes a condensing device positioned in the optical path between the light source and the SVF.

The system includes an aperture in the optical path between the SVF and the optical director.

The system includes a second condensing device positioned in the optical path between the SVF and the aperture.

The system includes a collimator device positioned in the optical path between the aperture and the optical director.

The system includes a third condensing device positioned in the optical path between the optical director and the detector.

The optical objective includes an interference objective configured for non-contact optical measurements of the sample when present.

The optical objective includes a beam-splitter and a reference mirror.

The interference objective includes at least one of a Mirau objective and a Michelson objective.

The SVF includes a linear variable filter (LVF), wherein the LVF is configured to have spectral properties that vary linearly with position along a direction of the LVF.

Output illumination of the LVF includes a wavelength that varies as a linear function of a position of input illumination on the LVF.

The LVF is configured so a spatial position illuminated on the LVF selects an output wavelength of the LVF.

The LVF comprises a substrate including an interference coating that is graduated along a direction of the LVF.

A position of the LVF relative to the light source is configured as variable, wherein the LVF is scanned with the light source.

An output of the LVF includes a series of collimated monochromatic light beams.

The output of the LVF includes light having a wavelength approximately in a range of 300 nanometers (nm) to 850 nm.

The LVF is tunable.

The LVF includes a variable pass band filter comprising a short wave pass component and a long wave pass component.

The short wave pass component includes a first LVF and the long wave pass component includes a second LVF.

The short wave pass component is positioned adjacent the long wave pass component.

A first position of at least one of the short wave pass component and the long wave pass component is adjusted relative to a second position of the other of the short wave pass component and the long wave pass component, wherein a pass band of the LVF is determined by the first position and the second position.

The system includes a translation stage configured to control at least one of the first position and the second position.

The SVF includes a circularly variable filter (CVF), wherein the CVF is configured to have spectral properties that vary with position along an arc of the CVF.

The SVF is tunable.

A position of the SVF in the optical path includes a first region between the light source and the retention device.

The system includes a dichroic filter in the first region.

A position of the SVF in the optical path includes a second region between the detector and the retention device.

The system includes a dichroic filter in the second region.

The SVF includes a first SVF component and a second SVF component.

The first SVF component includes a short wave pass component and the second SVF component includes a long wave pass component.

The first SVF component includes a long wave pass component and the second SVF component includes a short wave pass component.

A position of the first SVF component includes a first region of the optical path between the light source and the retention device, and a position of the second SVF component includes the first region.

A position of the first SVF component includes a second region of the optical path between the detector and the retention device, and a position of the second SVF component includes the second region.

A position of the first SVF component includes a first region of the optical path between the light source and the retention device.

A position of the second SVF component includes a second region of the optical path between the detector and the retention device.

The system includes a dichroic filter adjacent at least one of the first SVF component and the second SVF component.

Embodiments include a method comprising configuring an optical path to couple light between a light source, a sample when present, and a detector. The method includes configuring an optical objective to couple light from the light source to the sample when present, and couple reflected light to the detector. The method includes controlling at least one of focus and beam path of the light directed by the optical objective to the sample when present. The method includes configuring the optical path to include a spatially variable filter (SVF) to control properties of at least one of the light and the reflected light. The SVF is configured to pass light having spectral properties that vary as a function of a position of illumination on the SVF. The method includes configuring the detector to receive reflected light from the optical objective and to generate from the reflected light an output representing a film thickness and a surface profile of the sample when present.

Embodiments include a method comprising: configuring an optical path to couple light between a light source, a sample when present, and a detector; configuring an optical objective to couple light from the light source to the sample when present, and couple reflected light to the detector; controlling at least one of focus and beam path of the light directed by the optical objective to the sample when present; configuring the optical path to include a spatially variable filter (SVF) to control properties of at least one of the light and the reflected light, wherein the SVF is configured to pass light having spectral properties that vary as a function of a position of illumination on the SVF; configuring the detector to receive reflected light from the optical objective and to generate from the reflected light an output representing a film thickness and a surface profile of the sample when present.

The method includes configuring the optical path to include an optical director, and configuring the optical director to at least one of couple light from the light source to the optical objective and couple reflected light from the sample when present to the detector.

The method includes configuring the optical path to include a condensing device between the light source and the SVF.

The method includes configuring the optical path to include an aperture between the SVF and the optical director.

The method includes configuring the optical path to include a second condensing device between the SVF and the aperture.

The method includes configuring the optical path to include a collimator device between the aperture and the optical director.

The method includes configuring the optical objective to include an interference objective configured for non-contact optical measurements of the sample when present, wherein the interference objective includes at least one of a Mirau objective and a Michelson objective.

The method includes configuring the optical objective to include a reference mirror.

The method includes configuring the SVF to include a linear variable filter (LVF), wherein the LVF is configured to have spectral properties that vary linearly with the position along a direction of the LVF.

The method includes configuring the LVF as tunable, wherein output illumination of the LVF includes a wavelength that varies as a linear function of the position of input illumination on the LVF.

The method includes configuring the LVF so a spatial position illuminated on the LVF determines an output wavelength of the LVF.

The method includes configuring as variable a position of the LVF relative to the light source, wherein the LVF is scanned with the light source.

The method includes configuring the output of the LVF to include light having a wavelength approximately in a range of 300 nanometers (nm) to 850 nm. The method includes configuring the LVF to include a variable pass band filter including a short wave pass component and a long wave pass component.

The short wave pass component includes a first LVF and the long wave pass component includes a second LVF.

The short wave pass component is positioned adjacent the long wave pass component.

The method includes adjusting a first position of at least one of the short wave pass component and the long wave pass component relative to a second position of the other of the short wave pass component and the long wave pass component, wherein a pass band of the LVF is determined by the first position and the second position.

A position of the SVF in the optical path includes a first region between the light source and the sample.

A position of the SVF in the optical path includes a second region between the detector and the sample.

The SVF includes a first SVF component and a second SVF component.

The first SVF component includes a short wave pass component and the second SVF component includes a long wave pass component.

The first SVF component includes a long wave pass component and the second SVF component includes a short wave pass component.

A position of the first SVF component includes a first region of the optical path between the light source and the retention device, and a position of the second SVF component includes the first region.

A position of the first SVF component includes a second region of the optical path between the detector and the retention device, and a position of the second SVF component includes the second region.

A position of the first SVF component includes a first region of the optical path between the light source and the retention device, and a position of the second SVF component includes a second region of the optical path between the detector and the retention device.

The method includes generating at the detector reflectance data representing a surface of the sample when present.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the spectrometer systems and methods is not intended to be exhaustive or to limit the systems and methods described to the precise form disclosed. While specific embodiments of, and examples for, the spectrometer systems and methods are described herein for illustrative purposes, various equivalent modifications are possible within the scope of other spectrometer systems and methods, as those skilled in the relevant art will recognize. The teachings of the spectrometer systems and methods provided herein can be applied to other processing and measurement systems and methods, not only for the systems and methods described above.

The elements and acts of the various embodiments described above can be combined to provide further embodiments. These and other changes can be made to the spectrometer systems and methods in light of the above detailed description.

In general, in the following claims, the terms used should not be construed to limit the spectrometer systems and methods to the specific embodiments disclosed in the specification and the claims, but should be construed to include all systems and methods that operate under the claims. Accordingly, the spectrometer systems and methods are not limited by the disclosure, but instead the scope of the spectrometer systems and methods is to be determined entirely by the claims.

While certain aspects of the spectrometer systems and methods are presented below in certain claim forms, the inventors contemplate the various aspects of the spectrometer systems and methods in any number of claim forms. Accordingly, the inventors reserve the right to add additional claims after filing the application to pursue such additional claim forms for other aspects of the spectrometer systems and methods.

What is claimed is:

1. A system comprising:
a light source;
a retention device configured to receive and retain a sample for measurement;
a detector, wherein an optical path couples light between the light source, the sample when present, and the detector;
an optical objective configured to couple light from the light source to the sample when present, and couple reflected light to the detector;
a controller configured to automatically control at least one of focus or beam path of the light directed by the optical objective to the sample when present;
an optical device positioned in the optical path, wherein the optical device is configured to at least one of couple light from the light source to the optical objective or couple reflected light from the sample when present to the detector, wherein the optical device comprises at least one of a plurality of mirrors, a beamsplitter, a reflector, or an off-axis reflector;
a spatially variable filter (SVF) positioned in the optical path between the light source and the optical device, wherein the SVF is configured to include an interference coating graduated in a direction to generate spectral properties that vary as a function of an illuminated position on the SVF along the direction, wherein the spatial variable filter includes a bandpass linear variable filter (LVF) that includes a first LVF and a second LVF simultaneously positioned in the optical path, and wherein the first LVF is configured as a linear variable long wave pass filter and the second LVF is configured as a linear variable short wave pass filter;

an aperture in the optical path; and
a condensing lens positioned in the optical path between the light source and the SVF, wherein the condensing lens is configured to focus the light to a point at the aperture.

2. The system of claim 1, wherein the detector comprises a spectrometer.

3. The system of claim 1, wherein the detector comprises a processing device configured to generate data representing a surface of the sample when present.

4. The system of claim 3, wherein the detector is configured to output data representing at least one of a film thickness or a surface profile of the sample.

5. The system of claim 1, wherein the controller is coupled to the optical objective and configured to control focus of the optical objective by controlling a vertical position of the optical objective relative to the retention device.

6. The system of claim 1, wherein the controller is configured to automatically control differences in the focus to determine a surface profile of the sample.

7. The system of claim 6, wherein the detector is configured to output data representing the surface profile.

8. The system of claim 1, wherein the controller is coupled to the retention device and configured to control focus of the light directed from the optical objective by controlling a vertical position of the retention device relative to the optical objective.

9. The system of claim 1, wherein the aperture is between the SVF and an optical device.

10. The system of claim 9, comprising a second condensing lens positioned in the optical path that focuses the light to a point on the SVF.

11. The system of claim 9, comprising a collimator device positioned in the optical path between the aperture and the optical device.

12. The system of claim 9, comprising a third condensing lens positioned in the optical path between the optical device and the detector.

13. The system of claim 1, wherein the optical objective includes an interference objective configured for non-contact optical measurements of the sample when present.

14. The system of claim 13, wherein the optical objective includes a beam-splitter and a reference mirror.

15. The system of claim 13, wherein the interference objective includes at least one of a Mirau objective or a Michelson objective.

16. The system of claim 1, wherein the LVF is configured to have spectral properties that vary linearly with position along a direction of the LVF.

17. The system of claim 16, wherein output illumination of the LVF includes a wavelength that varies as a linear function of a position of input illumination on the LVF.

18. The system of claim 16, wherein the LVF is configured so a spatial position illuminated on the LVF selects an output wavelength of the LVF.

19. The system of claim 16, wherein the LVF comprises a substrate including an interference coating that is graduated along a direction of the LVF.

20. The system of claim 16, wherein a position of the LVF relative to the light source is configured as variable, wherein the LVF is scanned with the light source.

21. The system of claim 16, wherein an output of the LVF includes a series of collimated monochromatic light beams.

22. The system of claim 21, wherein the output of the LVF includes light having a wavelength approximately in a range of 300 nanometers (nm) to 850 nm.

23. The system of claim 16, wherein the LVF is tunable.

24. The system of claim 23, wherein the short wave pass component is positioned adjacent the long wave pass component.

25. The system of claim 24, wherein a first position of at least one of the short wave pass component or the long wave pass component is configured to be adjusted relative to a second position of the other of the short wave pass component and the long wave pass component, wherein a pass band of the LVF is determined by the first position and the second position.

26. The system of claim 25, comprising a translation stage configured to control at least one of the first position or the second position.

27. The system of claim 1, wherein the SVF is tunable.

28. The system of claim 1, wherein a position of the SVF in the optical path includes a first region between the light source and the retention device.

29. The system of claim 28, comprising a dichroic filter in the first region.

30. The system of claim 28, wherein a position of the SVF in the optical path includes a second region between the detector and the retention device.

31. The system of claim 30, comprising a dichroic filter in the second region.

32. A method comprising:
configuring an optical path to couple light between a light source, a sample when present, and a detector;
configuring an optical objective to couple light from the light source to the sample when present, and couple reflected light to the detector;
controlling at least one of focus or beam path of the light directed by the optical objective to the sample when present;
configuring the optical path to include an optical device, and configuring the optical device to at least one of couple light from the light source to the optical objective or couple reflected light from the sample when present to the detector, wherein the optical device comprises at least one of a plurality of mirrors, a beamsplitter, a reflector, or an off-axis reflector;
configuring the optical path to include a spatially variable filter (SVF) between the light source and the optical device to control properties of at least one of the light or the reflected light, wherein the SVF is configured to include an interference coating graduated in a direction to generate spectral properties that vary as a function of an illuminated position on the SVF along the direction, wherein the spatial variable filter includes a bandpass linear variable filter (LVF) that includes a first LVF and a second LVF simultaneously positioned in the optical path, and wherein the first LVF is configured as a linear variable long wave pass filter and the second LVF is configured as a linear variable short wave pass filter;
configuring the optical path to include an aperture;
configuring the optical path to include a condensing lens between the light source and the SVF that focuses the light to a point at the aperture; and
configuring the detector to receive reflected light from the optical objective and to generate from the reflected light an output representing a film thickness and a surface profile of the sample when present.

33. The method of claim 32, wherein the aperture is between the SVF and the optical device.

34. The method of claim 33, comprising configuring the optical path to include a second condensing lens that focuses the light to a point on the SVF.

35. The method of claim 33, comprising configuring the optical path to include a collimator device between the aperture and the optical device.

36. The method of claim 32, comprising configuring the optical objective to include an interference objective configured for non-contact optical measurements of the sample when present, wherein the interference objective includes at least one of a Mirau objective or a Michelson objective.

37. The method of claim 32, comprising configuring the optical objective to include a reference mirror.

38. The method of claim 32, wherein the LVF is configured to have spectral properties that vary linearly with the position along a direction of the LVF.

39. The method of claim 38, comprising configuring the LVF as tunable, wherein output illumination of the LVF includes a wavelength that varies as a linear function of the position of input illumination on the LVF.

40. The method of claim 38, comprising configuring the LVF so a spatial position illuminated on the LVF determines an output wavelength of the LVF.

41. The method of claim 38, comprising configuring as variable a position of the LVF relative to the light source, wherein the LVF is scanned with the light source.

42. The method of claim 38, comprising configuring the output of the LVF to include light having a wavelength approximately in a range of 300 nanometers (nm) to 850 nm.

43. The method of claim 32, wherein a position of the SVF in the optical path includes a region between the light source and the sample.

44. The method of claim 32, wherein a position of the SVF in the optical path includes a region between the detector and the sample.

45. The method of claim 32, comprising generating at the detector reflectance data representing a surface of the sample when present.

* * * * *